March 19, 1968 — E. C. SPANGLER — 3,373,783
AUTOMATED FOOD PROCESSING LINE
Filed Oct. 10, 1966 — 4 Sheets-Sheet 1

INVENTOR
EUGENE C. SPANGLER
BY
ATTORNEYS

March 19, 1968 — E. C. SPANGLER — 3,373,783
AUTOMATED FOOD PROCESSING LINE
Filed Oct. 10, 1966 — 4 Sheets-Sheet 2

INVENTOR
EUGENE C. SPANGLER
BY Browne, Schuyler & Beveridge
ATTORNEYS

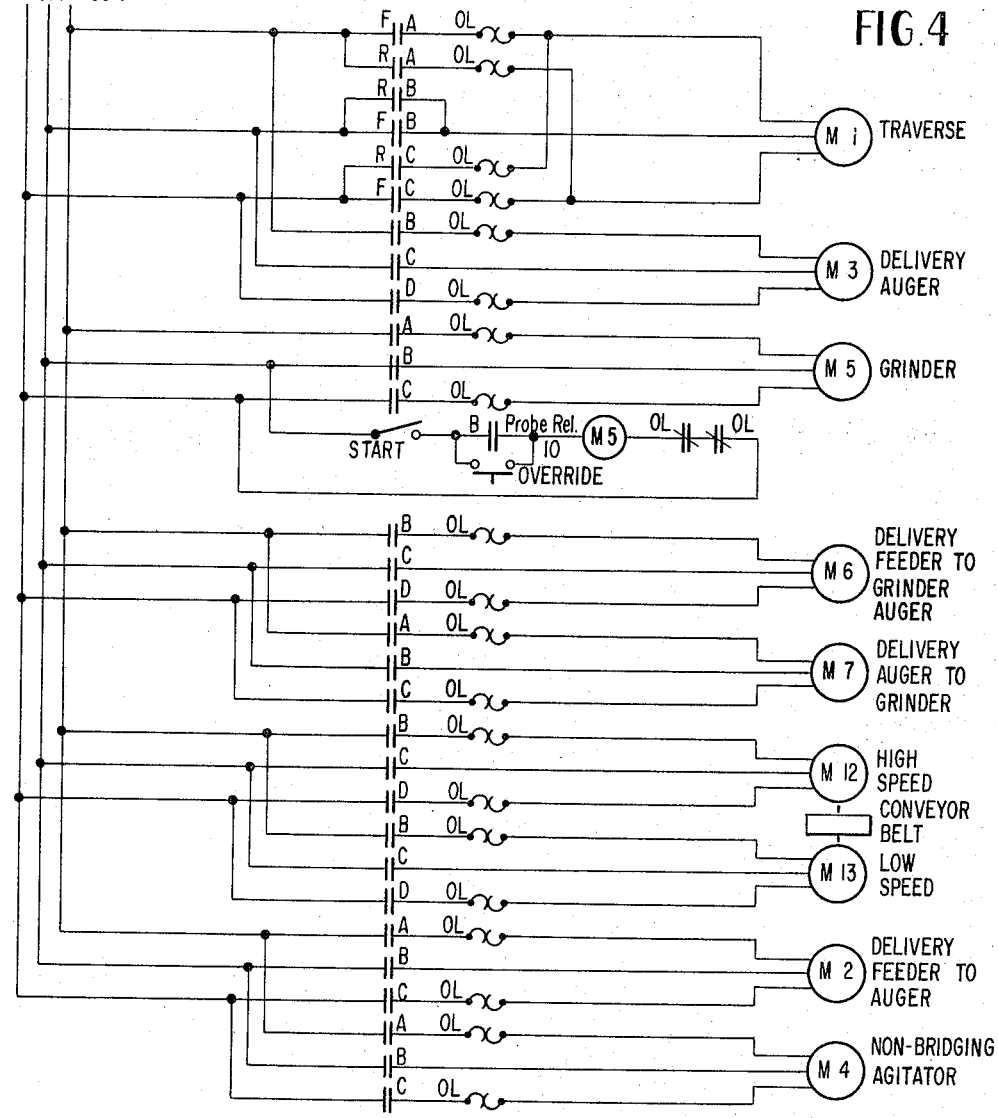
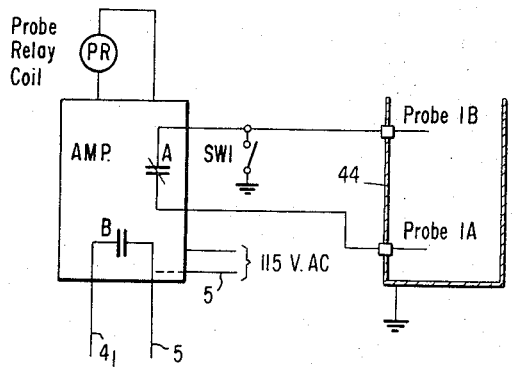

March 19, 1968     E. C. SPANGLER     3,373,783
AUTOMATED FOOD PROCESSING LINE
Filed Oct. 10, 1966     4 Sheets-Sheet 4

INVENTOR
EUGENE C. SPANGLER

BY Browne, Schuyler & Beveridge

ATTORNEYS

United States Patent Office 3,373,783
Patented Mar. 19, 1968

3,373,783
AUTOMATED FOOD PROCESSING LINE
Eugene C. Spangler, Silver Spring, Md., assignor to Marriott Corporation, a corporation of Delaware
Filed Oct. 10, 1966, Ser. No. 585,526
10 Claims. (Cl. 146—1)

This invention relates to automation of food processing operations suitable for furnishing prepared portions in large supply house quantities as might be employed advantageously for a chain of hotels or restaurants extending over a considerable portion of the country. More particularly, the invention provides automatic interlocking controls in a series of automated operations, which eliminates the need for attendants heretofore necessary in performing the operations.

An automated system according to this invention may be applied to a number of food processing steps but is herein illustrated in connection with mixing and grinding hamburger meat automatically supplied to a number of machines where it is to be formed into patties and stacked for distribution to sales outlets, individual restaurants, and the like. A number of features of the system are similarly applicable to other food processing steps where the problem of automatic signaling of demand at a processing machine, automatic indexing, and automatic adjustment of quantities delivered are of significance and vital to the success of such an automated system. It will be understood that the specific elements of the system and the particular electrical connections shown illustrate functions and the interlocking control therebetween irrespective of the details of the machines or of the detailed circuitry to perform the desired functions.

This invention responds to a need long felt in large-scale food processing, particularly illustrated in the manufacture of hamburger patties. It has heretofore been recognized that hamburger patties may be prepared mechanically from a ground meat supply placed in the hopper of a suitable machine, such a machine being well known in the art. A system according to the present invention serves as the source of supply as an automatic distributor to a group of machines in accordance with demand registrable in each such machine as a demand signal.

As previously practiced, patty-making machines are generally supplied from meat grinders which are operated by an attendant who observes the need for replenishing the supply of ground meat in each of the several patty-making machines he services. A suitable conveyor may be operated electrically by manually controlled operate switches to be positioned to supply individual patty-making machines observed to be in need of additional supply. A final meat grinder may be supplied by a conveyor system operating from the bottom of a storage container into which batches of the mixed product have been placed. The storage container may be fed from a mixer and chopper which prepares a mixture of product for transfer to the final grinding stage. The grinding of the product prior to depositing the same in the storage container is normally by discontinuous operation according to need. Weighing suitable quantities of different constituents for the mixture is accomplished before depositing in a cutter-mixer prior to operation thereof to fill the storage container.

A batching system as above outlined has been a manually controlled operation requiring several attendants for a large quantity production, and a considerable amount of handling of the material is necessary, as well as visual observation and control of the various steps in the operation. Elimination of handling costs and all attendants except one is a recognized need in the business. A number of disadvantages are consequent upon manual operation and the requirement for handling materials in a room kept, for example, at 38°. While it has long been desired to fully automate such a food preparation system, problems have been inherent in automating the supply of material from a mixer or a grinder to each of several finishing machines in turn from the same source, including the need to avoid all spillage and the need to bring the mixture temperature below the temperature of the room during patty formations.

It is one object of this invention to provide an automatic system for distributing a processed product in accordance with need to each of several individual finishing machines.

A further object of the invention is to provide means for generating and conveying a demand signal to a delivery mechanism and means for continuing the supply of prepared material for a predetermined quantity beyond the quantity needed to terminate the demand signal.

Another object of the invention is to provide a system in which a number of finishing machines may be supplied automatically in turn according to need from a central mixing and grinding operation when more than one machine calls for material, with means preventing wastage of the product.

A still further object of the invention is to provide a system in which each of several supply points provides a demand signal when the supplied product falls below a predetermined minimum, one of which is selected to cause the product distributor to approach and stop at such position, after which the product is supplied in predetermined amounts and the distributor then caused to proceed to any other position in which a demand signal may then be registered.

Other objects and advantages of the invention will be appreciated as the description proceeds in connection with the drawings in which:

FIG. 3 is a diagram of a detail of a demand signal generator for use with a circuit according to FIG. 2;

FIG. 4 is a detail diagram of motor controls compatible with a circuit according to FIG. 2 for automatically operated motors;

Figure 1:
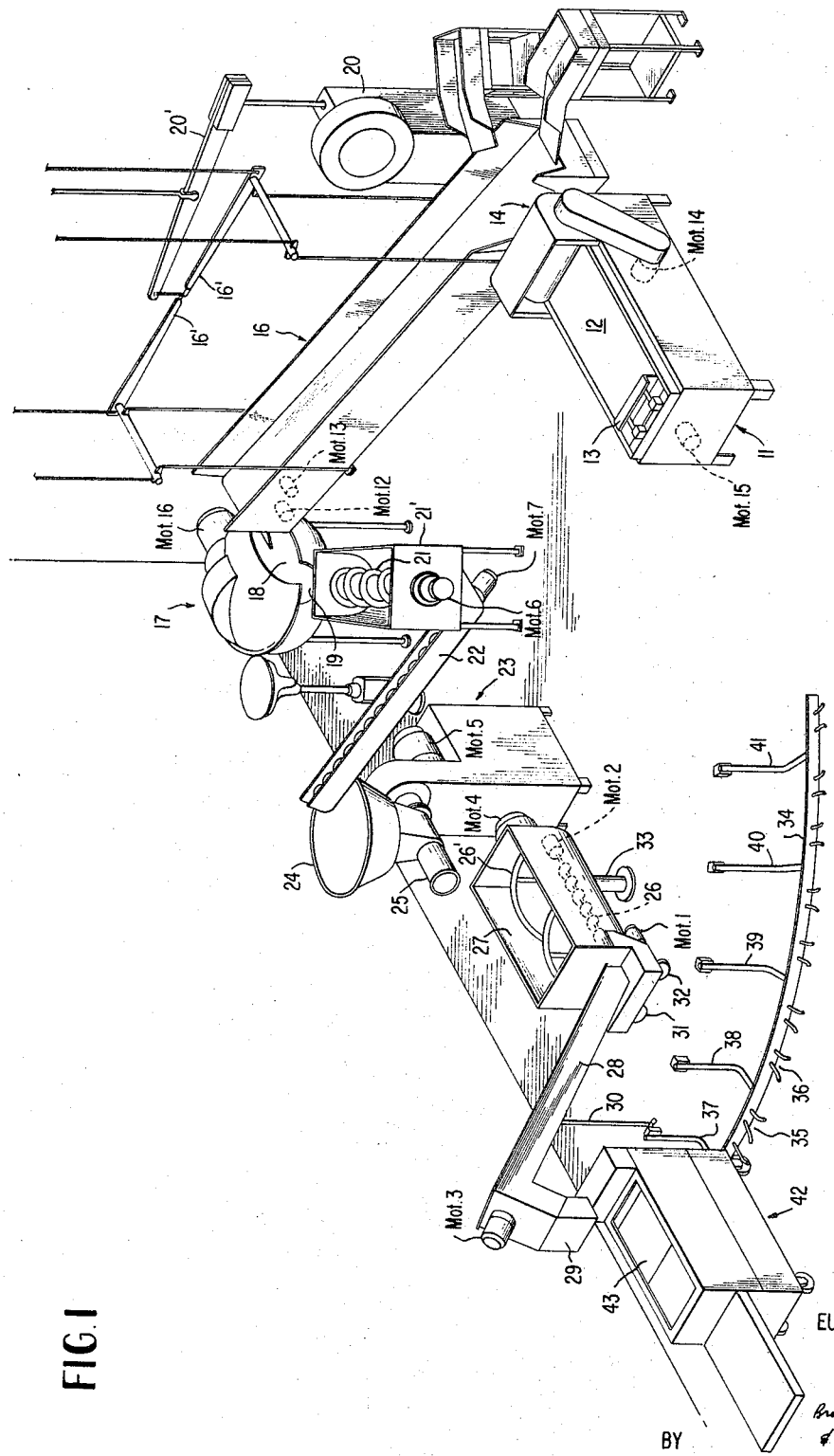
FIG. 1 is a perspective view of apparatus for carrying out this invention.

Referring now to the drawings in detail, the illustrated system includes a frozen meat chipper or flaker 11 which may be of the type known as a Hydrauflaker and generally comprises a table 12 on which 60-pound portions of frozen chuck may be placed and fed to a flaking blade by feed plunger 13 to provide an output of chipped product under control of motors 14 and 15, from a pushbutton control, a single operator having charge of the system, who may also supply blocks of frozen and fresh meat according to need.

Several requirements are significant in a system of preparing hamburger patties on a large scale for sale to many outlets of a restaurant or hotel chain or for supply to various hotel supply houses, including temperature control and product mixture. For a number of reasons, it is important to utilize several types of meat components, each adjusted by scaling in the mix in order to provide uniformity of product. Also, it is important to control consistency by controlling temperature of the product within very close limits so that the automatic patty-making machines will operate properly.

Components of the mixture may be varied for purposes of economy and to utilize standardized units of frozen product which are most readily available throughout the country in large quantities. For this reason, one component of the mixture is in the form of frozen meat blocks, for example frozen chuck, which is delivered and retained at a much lower temperature than that of the room in which the meat is prepared for patty-forming. However, it is also important that the temperature of the processing room be retained above freezing, for example 38°, which is a temperature too high for the proper forming of patties. By way of example, a 60-pound block of frozen chuck may be mixed with 100 pounds of fresh chuck, or the like, and to this may be added fat trim from the steak or roast tables as such meats are prepared for roasting and broiling. This component has a high fat content and is used in variable quantity to produce a mix having higher fat content than the frozen or fresh chuck, which may vary from about 12% to 20%. Since it is desirable to maintain uniformity of product in any large scale operation, it is necessary to weigh out the component parts of the mixture for each batch, using a variable quantity of trim and variable amounts of frozen chuck to which are added fresh chuck, as needed, to provide the appropriate temperature and fat content.

To make all operations as nearly automatic as possible and avoid the necessity of handling the meat products in the tonnages required for a major patty-making operation, a partially automated batching and weighing conveyer is provided. The importance of this is realized when it is noted that quantities approximating 200 pounds must frequently be required to maintain the supply at several patty-making machines operating at normal rates. Accordingly, a linear walled scaling conveyer 16 is provided having a pair of support arms fixedly positioning the conveyer in longitudinal and lateral directions and variable arms actuating scale 20. Scaling conveyer 16 empties at controllable speed into mixer-cutter 17 having open top 18 and port 19. A second arm and linkage 20' is attached to scaling conveyer arms 16' to actuate the conveyer scale 20 and indicate the weight of the material on the scaling conveyer. For this purpose, it is understood that scale 20 may be suitably adjusted to read zero when no product is carried on the conveyer. It is also convenient in the interest of time economy to provide two speeds at which the scaling conveyer operates to carry products to the cutter 17. Fast and slow buttons may be provided for controlling the drive motor to operate at slow or at fast speed. During the operation of flaker 11, this conveyer will normally be operating at a continuous slow speed suitable for adding to the desired quantity of frozen meat the selected proportions of fresh meat and fat-contaning trim. When the predetermined constituents have been weighed out on scaling conveyer 16 its speed is increased to thereupon deposit the batch promptly in cutter 17.

Auger 21 attaches adjacent to port 19 to receive the chopped and mixed product from a conventional cutter or chopper not herein described in detail, and advances it to enter conveyer 22 to elevate the product into grinder 23, having hopper 24, whence the product is ground and extruded from grinding head 25 into a storage bin and auger arrangement 26, 27.

Three or more constituents of a mixture are thus apportioned on an operating conveyer which automatically weighs the several constituents as added and indicates when appropriate proportions have been assembled. Mixer or cutter 17 then operates to reduce all constituents to grinding size. Two or more constituents will be assumed to be at a room temperature such as 38° and a further constituent at a much lower "deep-freeze" temperature, which serves to bring the average mix temperature down to a value appropriate for patty forming, usually at 32° or lower. The batch thus mixed is ground at 23 and deposited in bin 27 where it is stored and distributed to the several patty-making machines upon demand signal indicating near exhaustion of the supply. Storage bin 27 has an output port at the end of auger 26 leading to delivery conveyer 28 having spout 29 from which the mixed and ground product is delivered to the final processing machines.

Figure 2:
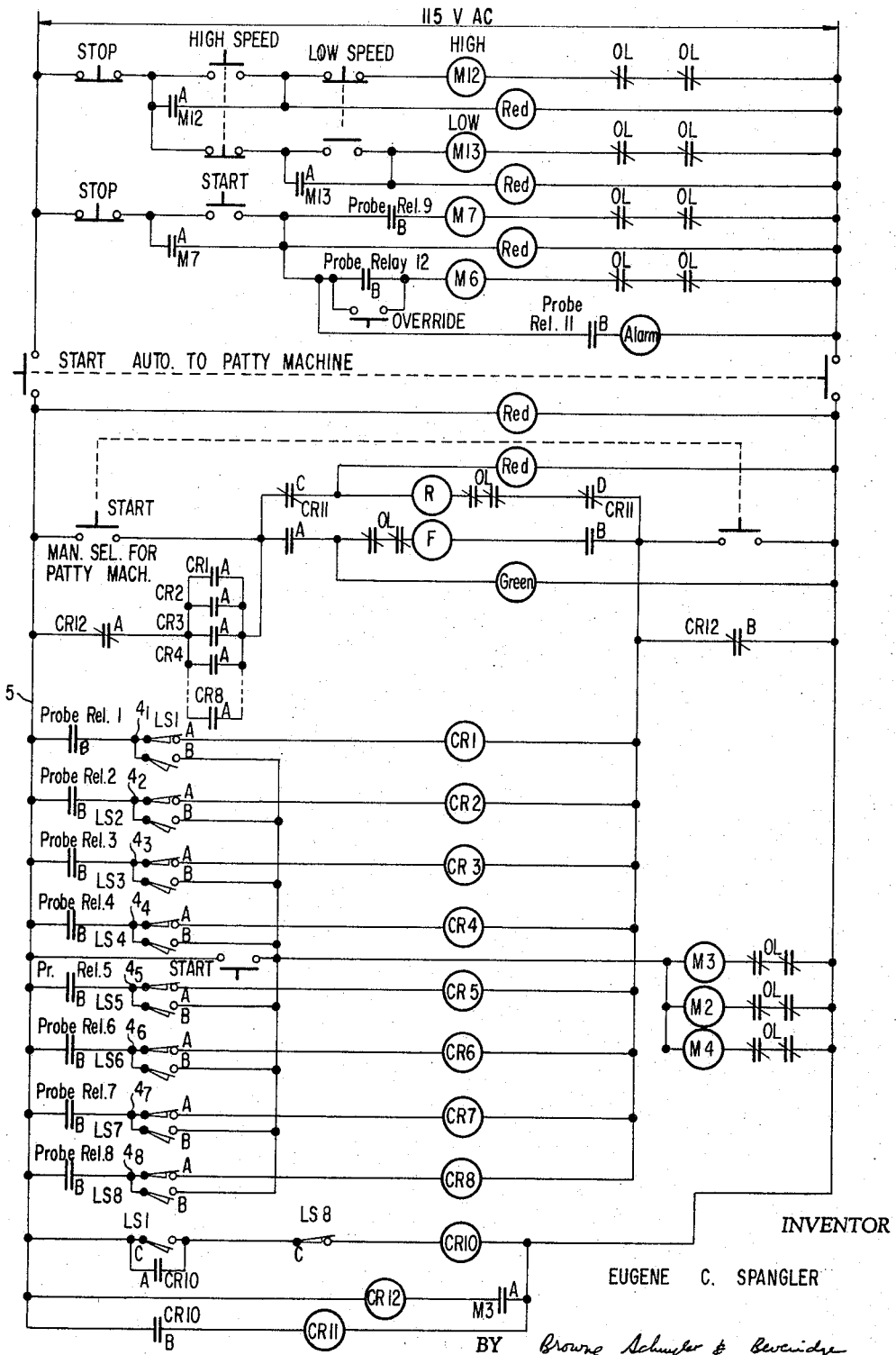
FIG. 2 is an electrical diagram of automatic and manual operations for apparatus of FIG. 1.

According to one mode of operation of a system of this general type, a single patty-making machine could be permanently located beneath spout 29 and filled by manual operation of the switch when an operator determines that an additional supply of product is needed by the finishing machine. As used in the manufacture of hamburgers, the conventional patty-making machine has a processing rate which is only a fraction of the desired rate of production, and a number of such machines may be required, particularly during hours of maximum demand. A batching conveyer, mixer, grinder, and storage tub facilities are adequate for a much higher rate of production than can be accomplished in a single patty-making machine. While any number of patty-forming machines could be employed, FIG. 1 illustrates five such machines which may be distributed about a central point beneath the grinding head 25. FIG. 2 shows schematically, connections for eight machines of which relay connections for relay 1 are shown in FIG. 3. Storage hopper or bin 27 may be supported by reversibly driven wheels 31, 32 and pivot 33, the later being beneath the grinding head 25, the wheels being mounted for moving the delivery conveyer or auger 28 and spout 29 in a circular arc about the pivot 33. A circular rail 34 provides a fixed stop at all points equidistant from pivot 33 and has associated therewith pairs of positioners 35 and 36 arranged to receive the patty-making machines 42 in fixed position. Indexing stands 37–41, etc., are located adjacent rail 34 at positioners 35, 36, and cooperate with index arm 30 attached beneath conveyer 28 to indicate when the conveyer spout 29 is located directly above hopper 43 of finishing machine 42.

Filling of hoppers automatically without the necessity for an operator requires that drive wheels 31, 32, be automatically operated and automatically stopped, as well as reversed, according to a demand signal indicating which hopper requires additional feed. For this purpose a switch including normally open and normally closed contacts may be arranged either on index arm 30 or on one of the index stands illustrated, which operates to interrupt the current in the drive motor serving to operate drive wheels 31 and 32, at which time the drive motor is arranged to be self-braking to instantly stop movement of conveyer 28 at the point above that hopper 43 which has provided the demand signal.

It will now be apparent that a demand signal will be required when the product falls below a minimum level in one of the hoppers and that the delivery conveyor may then be caused to approach that hopper and to deliver thereinto a supply of the product. However, it will also be apparent that more than one machine 42 may be calling for an additional supply at the same time and that an electrical indication of whether or not the supply is above or below the selected minimum quantity at which the demand signal is produced will be inadequate to keep a distribution system operating smoothly without interruption. For this reason, the demand signal is caused to be made effective prior to the exhaustion of the supply in the hopper 43 by locating the lower probe above the hopper bottom.

Also, a lower probe A in wall 44 which causes a demand signal whenever no product is in contact therewith, when used alone, would, as soon as the product reaches the level of lower probe A, terminate the demand signal when only a small amount of product has been added. A second probe B is placed at a higher level in hopper 43, so arranged that a minimum quantity is delivered after the product level reaches the level of probe A, being shut off only as the product level reaches probe B. Probes A and B are conveniently of brass or stainless steel inserted through an insulating bushing such as of Teflon in hopper wall 44 so as to provide means for applying a small potential between wall 44 and probe A or B. The presence of conductive material in contact with either probe and grounded wall 44 permits current to pass from the probe to the wall, which is utilized through suitable relay and amplifying means indicated in FIG. 3 to operate the demand signal in the case of probe A and a stop signal upon reaching probe B. It is thus seen that a minimum quantity will be delivered each time conveyor 28 approaches the particular hopper from which a demand signal is obtained.

In addition to automatic level controls contained in patty-making machine hoppers 43, level probes may also indicate the quantity of material temporarily stored in the hopper 21′ as delivered from chopper 17 and in the storage hopper 27. Storage hopper 21′ may be referred to as the grinder-feeder hopper since it contains the material which is fed to the grinder. Hopper 27 may be referred to as the agitator and serves as the main storage for keeping the delivery auger supplied so that the delivery auger in turn may supply the several machines according to demand signal. An agitator screw 26′ is driven by motor 4 to keep the product stirred and free-feeding to auger 26.

In the grinder-feeder hopper one or two probes of the character hereinbefore described may be used in which the presence of product at the upper probe level produces a signal to an electronic relay (not shown) serving merely to close a circuit and to cause an alarm to be sounded whenever the level of the product exceeds the level of this probe. A second probe may be used at a lower level suitably adjusted to indicate a minimum quantity of product for feeding to the auger which delivers this product to the grinder. This second probe also connects to an electronic relay, and serves to interrupt the circuit to the motor of the grinder and/or other subsequent operations which may need to be protected against damage due to running in an idle or unfilled condition. The schematic circuit diagram showings of these relays are indicated as "open" or "closed" switches to provide, in the one case, for the closing of an alarm circuit, and in the other case for the opening of the motor circuit.

A three-probe system is preferably employed in agitator 27 in which an upper probe 1 senses the product at that level, as in the case of the previously described probes, and operates to feed a signal in response to conductivity between the probe and the wall, to an electronic probe relay 9 which causes motor 5 to shut down until the meat level drops below a second and immediate level probe 2 in that container. Breaking the circuit between this probe and the wall of the container operates, through the electronic relay, to open the circuit to motor 7 according to the general plan of the schematic diagram. A third and lower probe similarly operates to detect the absence of product between this probe and the container wall, again operating through an electronic probe relay 10, which constitutes circuit breaking means in series with grinder motor 5, as the level of the product is lowered. The third probe of hopper 27 is intended to prevent the machine from operating continuously when an insufficient amount of product is present to provide continuous supply of product through the next stage.

Understanding the automatic operation of the filling mechanism for hoppers 43 is facilitated by reference to the schematic diagram and to the following description of functions and sequence of operations.

It has previously been noted that probes A and B of each hopper 43 indicate low and high levels of the product in which these probes are preferably in the lower portion and at substantially the top, respectively, of the hoppers. The quantity of product delivered between the time of filling to lower probe A and to the upper probe B is a fixed or minimum quantity delivered each time the delivery feeder is operated. Starting from a fully empty condition there is also delivered the amount necessary to fill the hopper from the bottom to the level of probe B.

Operation of the automatic delivery portion of the system as described assumes that each hopper 43 is placed at a station, five being illustrated in FIG. 1 at stations 1, 2, 3, 4, and 5, their connections being as in the schematic diagram. When a hopper is in position and has connections made thereto at the insulated probe terminals a circuit is made to a probe relay associated with this hopper to energize control circuits in accordance with the location of that hopper then providing a demand signal, which signal is initiated and terminated in accordance with a quantity of product in the hopper.

At the several stations stands are provided including normally open limit switches LS1B . . . LS8B, which are closed upon approach thereto of the conveyor, and optionally include normally closed switches LS1A . . . LS8A, which are opened by presence of the conveyor. Assuming that the first of these stands carries switches LS1A and LS1B, these switches are connected in common to one side of the power line 5 by way of probe relay contact PR1B of PR1 and to the limit switch at $4_1$. LS1A is normally closed and makes a connection to energize control relay CR1 when the conveyer is not at station 1, while LS1B is normally open to make contact when the conveyer is at station 1 through LS1B to the combination of motors starters M2, M3, and M4 to the other side of the line. Each other probe relay has a contact B, likewise connected to terminal $4_2$ . . . $4_8$ of the associated pair of limit switches. Since M3 is the starter for the motor driving the delivery auger and M2 and M4 are auxiliary motors employed in supplying the delivery auger, these motors operate when M3 is operated and are actuated by starters M2 and M4.

Assuming that an individual hopper is empty (no product in contact with probe A) and that the position at which a hopper, assumed to be hopper 1, is located is activated for automatic operation by opening toggle switch SW1, the probe relay PR1 will be energized so that its contacts A are open and its contacts B are closed. Should product be placed in a hopper and reach the level of probe A, a relay operating from a single probe would no longer initiate a demand signal and supply would cease. However, two probes are provided and probe relays as here employed include a suitable electronic latching feature. When the product reaches upper probe B the relay coil becomes de-energized and this de-energized condition remains effective while the product decreases in level from probe B to probe A, whereupon the latching feature terminates and the relay coil is again energized to provide the demand signal, which continues until the level again reaches probe B.

One manner of accomplishing this result uses a vacuum tube amplifier and relay coil control and has probe B connected to the grid of a vacuum tube, probe A being connected to a normally closed contact as at 1A in the instance of a hopper at position 1. Probes 2A, 2B . . . 8A, 8B and probe relays PR1, PR2 . . . PR8 are associated with the hoppers at positions 1, 2 . . . 8, respectively, to the other side of contact 1A. The grid-to-cathode potential is negative. When the hopper is empty, probes 1A and 1B are free of ground. At this time PR1 has its coil energized since the grid-to-cathode potential is not sufficiently negative to prevent conduction in the vacuum tube of the relay, which permits the coil PR1 to remain energized by the plate current so that contact PR1B is closed and PR1A is open. As the hopper fills and the meat reaches probe 1A, probe 1A is shunted to ground through the resistance of the product in the hopper and also connected to a negative grid voltage source. No change in state of PR1 occurs as the product reaches probe 1A. As the hopper fills to the level of probe 1B, that probe is connected to ground through the resistance of the product and the combined resistance to ground is sufficiently low to cause the grid-to-cathode potential to become adequately negative to cut off the vacuum tube thereby to de-energize the coil of PR1. As this occurs, contact 1B opens and contact 1A closes. When contact 1B opens, energy is removed from the delivery auger motor (assuming LS1B to be closed). When contact 1A is closed, it connects probe 1B to probe 1A to maintain probe 1B in a relatively low resistive connection to ground until the product level falls below probe 1A at which time the coil is sufficiently energized to operate the contacts and the cycle may be repeated.

One mode of operation described for a probe relay suitable for use in the system, as described, is effective to provide a demand signal at one level of product in the delivery hopper and to continue this demand signal until the product level reaches the second probe, thereby to deliver a minimum quantity of product to the hopper, and this demand signal cannot again be initiated until the product falls below the first probe. Operation of an automatic sequencing of the hopper filling making use of the demand signal thus produced can now be described.

It will be understood that each of the hoppers to be supplied is similarly situated and supplied at one of the stations. Limit switches LS1A, LS1B . . . LS8A, LS8B are preferably located on the station index stands illustrated at 37, 38, 39, 41, etc., in FIG. 1, eight being provided if eight hoppers are to be supplied as in FIG. 2. In addition, it will be understood that the first and last of the hoppers has limit switches at the station stands, including third contacts as at LS1C and LS8C of FIG. 2, employed in connection with the reversing mechanism for the drive motors for traversing the conveyer, effective for reversing the direction of travel at those positions.

It will also be appreciated that a different type probe relay might be employed, having essentially the functions illustrated in FIG. 3, with output terminals 4 and 5 extending to corresponding points $4_1$, $4_2$, $4_3$ . . . $4_8$ of the limit switch common connections, and to power line connections 5 at the opposite side of probe relay contact B, as illustrated in FIG. 2.

Operation of the associated probe relay thus closes PR1B . . . PR8B, any number of which may be closed concurrently, but only one can operate through an LSB contact to operate the delivery motors. When the product level in one hopper is below probe A, the delivery conveyer 28 will automatically traverse toward that hopper, being stopped at the first station having closed contacts PRB, and will then be energized to fill the hopper above the level of probe B. The delivery auger motor, designated Mot. #3, is then de-energized by opening of the associated probe relay contacts B to break the connection through the appropriate limit switch B contact to the motor starters M2, M3, M4. Thereupon, the conveyer 28 will traverse to another hopper whose product level is below probe A and, if all hoppers are full, will remain at rest until the level of some other hopper falls below its probe A. The direction of traverse and sequence of filling the hoppers are dependent upon the actuation of limit switches LS1C and LS8C. Viewed from the delivery conveyer, actuation of LS1C occurs when the right-hand or first station becomes occupied by the conveyer to thus operate LS1 through a cam attached to arm 30 of conveyer 28. Further operation of the traverse motor occurs in a direction to move the conveyer in the counterclockwise direction while actuation of LS8C operates the opposite one of a pair of reversing coils R and F associated therewith to cause the traverse motor to operate in the opposite direction thereafter until LS1C is again actuated. If LS1C is actuated, the sequence of filling hoppers is 1, 2, 3, 4 . . . 8, and if LS8C is actuated the sequence of filling hoppers is 8, 7 . . . 1. If the conveyer is stopped in a mid position, the direction in which it will proceed when the next demand signal is received causes operation of the traverse motor in the same direction as occurred prior to its being stopped at that station. For example, with the conveyer in position 3 after having started from position 1 in which LS1C is actuated (and held by a lock-in circuit), it will be noted that if hopper 4 provides the next succeeding demand signal, the conveyer will travel directly to station 4. However, if the hopper at station 2 next becomes empty, the conveyer will first travel to station 8 where LS8C will be actuated and will then be reversed in direction and travel to station 2 where that hopper will then be filled. If, during the course of travel from station 3 to station 8 and from station 8 to station 2, hopper 3 were again to become empty, the conveyer would first stop at station 3 and fill hopper 3 before proceeding to station 2.

To further illustrate the automatic operation of the hopper filling, reference is made to the following cases and the control conditions established for various conditions in which the mechanism may be called upon to operate. Each of these cases will be described to show the control conditions providing the desired action under the assumptions of that particular case, reference being made particularly to FIGS. 2, 3 and 4, wherein it may be noted that contacts A and B are shown in the non-actuated or normal condition (PR not energized) but are actuated during a demand signal up to the grounding of probe B through the product (or by SW1).

*Case 1.*—The delivery conveyer is initially at position 1 when power is supplied and probe switches 1–8, designated SW1, SW2 . . . SW8 are closed (condition for manual operation); all hoppers are empty:

(a) control relays CR10 and CR11 are energized;
(b) probe relays 1–8 are not energized;
(c) probe contacts 1B–8B are open and 1A–8A are closed;
(d) limit switch LS1A is open and LS1B is closed, as is also LS1C (its circuit locked in by CR10A). LS2A–LS8A are closed, while LS2B–LS8B are open;
(e) delivery auger motor starter M3 is not energized;
(f) control relay CR12 is not energized;
(g) relays CR1–CR8 are not energized;
(h) traverse motor reversing starters F and R are not energized;
(i) delivery auger and traverse motors are not energized.

*Case 2.*—The equipment is in the same position as in Case 1 with the exception that probe switches 1–8 (SW1 . . . SW8) are open as shown in FIG. 3 to indicate that the equipment is in condition for operation according to the automatic mode:

(a) control relays CR10 and CR11 are energized;
(b) probe relays 1–8 are energized;
(c) probe relay contacts 1B–8B are closed and 1A–8A are open;
(d) limit switches are in the same position as in Case 1 since the delivery conveyer is in the same position;
(e) auger motor starter M3 is energized to cause the delivery auger to deliver the product;
(f) control relay CR12 is energized via M3A;
(g) relays CR1–CR8 are not energized;
(h) traverse motor reversing starters F and R are not energized;
(i) the auger motor is energized and operating and the traverse motor is not energized.

*Case 3.*—Delivery conveyor is at position 1 and conditions otherwise as in Case 2 except that the hopper at position 1 is full and a demand signal therefrom has terminated:

(a) control relays CR10 and CR11 are energized;
(b) probe relay PR1 is not energized and probe relays PR2–PR8 are energized to indicate therein demand signals;
(c) probe relay contacts PR1B are now open and PR2B–PR8B are closed; contacts PR1A are closed and contacts PR2A–PR8A are open;

(d) limit switches are in the same condition as in Cases 1 and 2 since the delivery auger is at position 1;
(e) delivery auger motor starter M3 is not energized for the reason that PR1B has opened and closed contacts at PR2B–PR8B are each in series with an open LSB switch;
(f) control relay CR12 is not energized;
(g) control relay CR1 is not energized and CR2–CR8 are energized;
(h) traverse motor reversing starter F is energized while R is not energized, thus to provide only forward motion for the traverse motor;
(i) delivery auger motor is not energized since motor starter M3 is not energized; traverse motor 1 is energized by the closing of contacts FA, FB, FC, by operation of starter F, to provide three-phase energization. The traverse motor remains energized until the conveyor reaches the next succeeding position in which a demand signal is found by completed circuit through contact B of the associated probe relay, in this case PR2B.

Case 4.—The filling of each hopper in turn proceeds as in Case 3 under the assumed condition that all hoppers were empty and the automatic operation was set up as in Case 2 when power was first applied to a suitable ON-OFF switch.

Case 5.—Delivery conveyor is in position 8 and all hoppers are assumed empty:

(a) control relays CR10 and CR11 are now de-energized setting up motor starter R via CR11C and opening circuit to starter F via CR11A;
(b) probe relays 1–8 are energized as in Case 2;
(c) probe relays contacts 1B–8B are closed and contacts 1A–8A are open;
(d) limit switch LS8A is open and LS8B closed, while LS8C is open to de-energize CR10; LS1A–LS7A are closed while LS1B–LS7B are open;
(e), (f), (g), (h), and (i) are in the same condition as Case 2.

Case 6.—Delivery conveyor at position 8, as in Case 5 except that hopper 8 is full:

(a) control relays CR10 and CR11 are not energized;
(b) probe relay 8 is not energized and probe relays 1–7 are energized;
(c) PR8B is open and PR1B–PR7B are closed; PR8A is closed and PR1A–PR7A are open;
(d) limit switch LS8A is open while LS8B is closed and LS8C is open; LS1A–LS7A are closed and LS1B–LS7B are open;
(e) the delivery auger motor starter M3 is not energized;
(f) control relay CR12 is not energized;
(g) control relay CR8 is not energized and control relays CR1–CR7 are energized;
(h) traverse motor reversing starter R is energized and F is not energized;
(i) delivery auger motor is not energized since PR8B is open and no other control relay can operate; traverse motor is energized and will continue to operate clockwise until a position is reached in which a demand signal occurs or will remain at position 8.

Case 7.—Operation to fill other hoppers beginning at the counterclockwise end as in Case 6; Conditions and controls for filling of hoppers 7–1 in reverse order are the same as for Cases 2–4, except that R is locked in.

Case 8.—Conditions are as in Case 2, with the exception that the conveyor is at position 3 and hopper 3 is full: Two subcases are considered, depending on whether the approach to position 3 last made was from position 1 or from position 8.

(A) Approach to position 3 from position 1:

(a) control relays CR10 and CR11 are energized;
(b) control relays 1, 2 and 4–8 are not energized;
(c) probe relay contacts 1B, 2B and 4B–8B are open, while contacts 1A, 2A and 4A–8A are closed;
(d) limit switch LS3A is opened and LS3B is closed; LS1C is shunted and LS8C is closed; LS1A, LS2A and LS4A–LS8A are closed, while LS1B, LS2B, and LS4B–LS8B are open;
(e) delivery auger motor starter M3 is energized;
(f) control relay CR12 is not energized;
(g) control relays CR1, CR2 and CR4–CR8 are energized;
(h) traverse motor starter F is energized and R is not energized;
(i) delivery auger motor is not energized; traverse motor is energized and operates to move the conveyor to position 4.

(B) Approach to position 3 from position 8:

(a) control relays CR10 and CR11 are not energized;
(b) probe relays 1, 2, and 4–8 are not energized;
(c) condition the same as described under (c) above of Case 8A;
(d) limit switch LS3A is open while LS3B is closed and LS1C is open and LS8C is closed and limit switches LS1–LS8 are as in Case 8A above.

The conditions under (e), (f), and (g) are as in Case 8A above;

(h) traverse motor starter F is not energized and R is energized;
(i) delivery auger motor is not energized; traverse motor is energized and carries delivery conveyor to position 2.

From the foregoing description it will be recognized that a set of uniquely determined circuit connections are thus established providing complete control of the traverse motor which controls the position of the delivery conveyer turning on and turning off the supply of products to the hoppers for each of the various positions in each of the circumstances in which a demand signal may be presented by operation of a proble relay to close a contact B and open a contact A.

Figure 5:
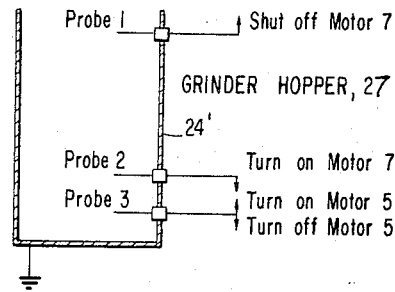
FIG. 5 is a diagram of one form of storage hopper level sensor used with apparatus of FIG. 1.
Figure 6:
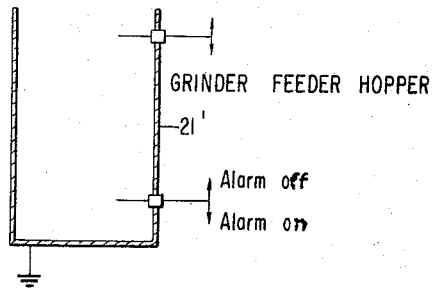
FIG. 6 is a diagram of one form of product level sensor for another hopper according to FIG. 1.
Figure 7:
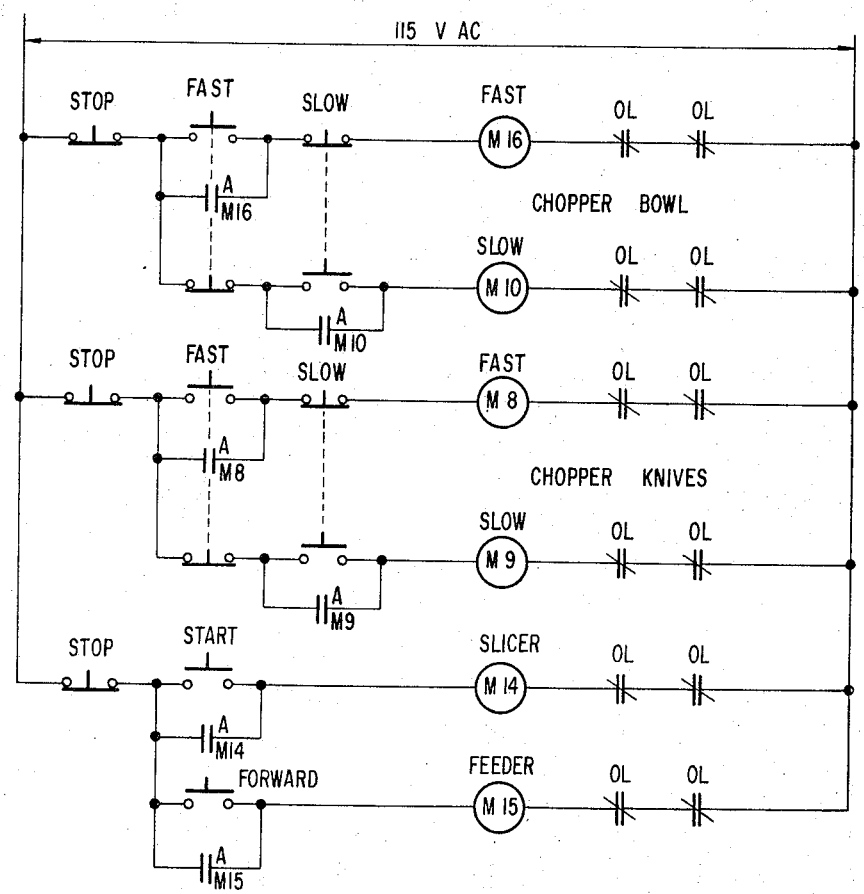
FIG. 7 is a detail diagram of manual controls for motors employed in the apparatus of FIG. 1.

Operation of motors illustrated in connection with all the automatic steps of the process is selectively controlled either manually or through automatic starters via series switches illustrated at FA, FB, FC and RA, RB and RC for motor 1 and at M2 and M4 by contacts A, B, and C for motors 2 and 4. Grinder motor 5 is controlled manually, or may have an additional probe relay 10, with an override switch for controlling the motor starter M5 making use of circuitry according to FIG. 5, also for semi-automatic control of motor 7. Motors subject to manual or batching operations only operate through manually operable switches in control of the respective motor starters as illustrated in FIGS. 2 and 7, with suitable provision for high and low speed as in motors 12, 13 and for override in various circumstances which may arise. Motors 6 and 7 may be controlled manually or by probe relays 9 and 12 as in FIG. 2.

So connected and controlled a single operator can maintain a supply of ground meat product from batches approximating 200 pounds each, at a controlled temperature below the room temperature and can feed the shaved or chipped frozen meat in appropriate proportion to other constituents to a fine chopper where the batch is mixed and ejected to a temporary storage. From this storage it is fed at a reduced rate, appropriate to the grinding speed, to a grinder for final grinding and storage in a bin or hopper. Bridging above the feeder auger is controlled by the agitator and a continuous fail-proof supply to the delivery auger is effected, and the delivery auger (together with agitator and feeder auger) is operated when, and only when, the conveyor terminates above an unfilled processing or utilizing station. Six or eight stations are thus intermittently supplied to maintain a continuous operation for each such finishing machine, all operated automatically except for portions of the batching process in a more automatic and fail-safe operation by a single operator than has previously been known in the art.

Numerous changes in detail are contemplated without departing from the spirit of the invention and other uses and processes than food mixing and grinding illustrated and described herein are readily achieved, and applicant seeks to limit the scope of coverage only as limited by the appended claims.

What is claimed is:

1. A food processing and distributing system for supplying a plurality of product stations in turn, comprising
    scaling conveyor means for depositing measured quantities of constituents of a batch in a mixer,
    mechanical means for cutting and mixing said constituents and ejecting the batch,
    means for storing said batch and conveying the same to a grinder at a rate independent of the ejecting rate,
    means for grinding said constituents,
    storage means for receiving the ground product,
    a plurality of product-using stations each having a receiving hopper,
    automatic delivery means for delivering said stored product to a said hopper in response to a demand signal therefrom,
    means including first and second probes in each said hopper for measuring maximum and minimum quantities of product and for generating said demand signal when the hopper content is below a minimum measured by said first probe,
    electrical interlock means for maintaining said demand signal, when generated, only until said content reaches a maximum measured by said second probe,
    motor means operative in response to said demand signal from a said hopper for causing said delivery means to approach thereto,
    automatic circuit means for causing said delivery means to adjust to said hoppers in turn when more than one generates a demand signal and for limiting the delivery of product to the duration of a demand signal.

2. A system according to claim 1, including probe and relay means for indicating when the quantity of product in said product storage means is below a minimum measured by one probe and above a maximum measured by another probe.

3. A system according to claim 1, wherein said motor means is controlled in motion in one direction until a station is reached at which a demand signal is generated including switching means responsive to the presence of the delivery means at that station for stopping operation of said motor means whenever a demand signal exists thereat.

4. A system according to claim 1, including means for causing said motor means to traverse said delivery means between stations successively in one direction to a final station of said plurality and for reversing said motor at said final station to traverse the delivery means in the opposite direction toward a first station when a demand signal is generated at another station.

5. A mixed batch processing and distributing system for supplying a plurality of further processing stations in sequence, comprising
    scaling conveyor means for depositing in a mixer measured quantities of constituents of a batch,
    mechanical means for processing and mixing said constituents and ejecting the batch,
    means for storing said batch and conveying the same to further processing apparatus,
    a plurality of further processing units each having a receiving hopper,
    automatic delivery means for delivering stored product to a said hopper in response to a hopper demand signal,
    means including first and second probes in each said hopper for indicating maximum and minimum quantities of product and for generating said demand signal when the hopper content is below a minimum indicated by said first probe,
    electrical interlock means for maintaining said demand signal, when generated, until said content reaches a maximum indicated by said second probe,
    motor means operative in response to said signal of each said hopper for causing said delivery means to adjust its delivery position thereto,
    automatic switching means for causing said delivery means to adjust in sequence to said hoppers when more than one generates a demand signal.

6. A system according to claim 5, including
    means receiving the mixed batch and conveying the same to a grinder hopper,
    means grinding and depositing said batch in a storage hopper for delivery at fixed rate to said further apparatus.

7. A system according to claim 5, said motor means and switching means comprising means causing said delivery means to traverse between said stations in response to a demand signal not generated at the station occupied by the delivery means and to continue traversal until a station having said signal is reached, including means terminating said traversal when an occupied station has a demand signal.

8. A system according to claim 5 including means for automatically operating the delivery means in response to a said demand signal originating at the hopper of the station occupied thereby, and to terminate to said delivery prior to operation of said motor means in response to another said demand signal.

9. Automatic food product processing apparatus comprising
    means for receiving and chipping a blocked frozen constituent of said product,
    means for measuring predetermined portions of further constituents and depositing said constituents in a mixing device,
    electrically operable means for mixing and processing said constituents and discharging the same at a controlled rate,
    means for grinding said constituents,
    electrical means for causing storing of ground constituents,
    conveyer means for delivering said stored constituents to each of a plurality of continuously operable product processing hoppers according to a demand signal,
    means producing and controlling said signal including a pair of probes in each of said hoppers for measuring maximum and minimum quantities of product therein and for generating an initial demand signal when said quantity is below said minimum as detected by one said probe,
    electrical interlock means responsive to said initial signal and operative to continue said signal until said maximum quantity is detected by the second probe, and for thereupon terminating said demand signal,
    motor control means associated with each said hopper for adjusting said delivery means to deliver stored product to a said hopper instantly providing a demand signal, and
    circuit means controlled according to position relative to said hoppers and by said demand signals for causing operation of said motor to adjust said conveyer means to each hopper providing a said signal in either direction in turn.

10. In a mechanism for controlling intermittent delivery of a stored product from a source to a plurality of hoppers associated each with a processing machine,
    a plurality of receiving hoppers,
    first signal means operative upon contact with said product in each said hopper above a first level, second signal means operative upon depletion of said product below a second and lower level of each hopper, means generating a demand signal for each said hopper responsive to a said second signal, means responsive to a said demand signal providing a holding signal corresponding to a said demand signal after a said second signal is no longer operative as the hopper is filled, means responsive to a first said signal at each hopper for terminating said holding signal, delivery conveyor means connected to receive product from said source including a delivery terminus movable to juxtaposition with each of said hoppers, means responsive to said demand signal for controlling the movement of said delivery means into juxtaposition to each of said hoppers, electrical interlock means controlling said conveyer means to initiate delivery at a hopper at which a demand signal is generated when said delivery means is in juxtaposition to a said hopper, and cycling means responsive to a plurality of said signals for causing movement of said delivery terminus in turn to each of said hoppers at which a demand signal is generated.

References Cited

UNITED STATES PATENTS

| 3,083,423 | 4/1963 | Hartley | 214—17 XR |
| 3,098,572 | 7/1963 | Quester | 214—17 X |
| 3,099,492 | 7/1963 | Mortimer | 214—17 X |
| 3,298,057 | 1/1967 | Liebmann | 17—32 |

W. GRAYDON ABERCROMBIE, *Primary Examiner.*